O. E. NELSON.
SYSTEM FOR INDICATING THE CONDITION OF INTERNAL COMBUSTION ENGINES.
APPLICATION FILED FEB. 13, 1915.
1,205,379.
Patented Nov. 21, 1916.
3 SHEETS—SHEET 1.
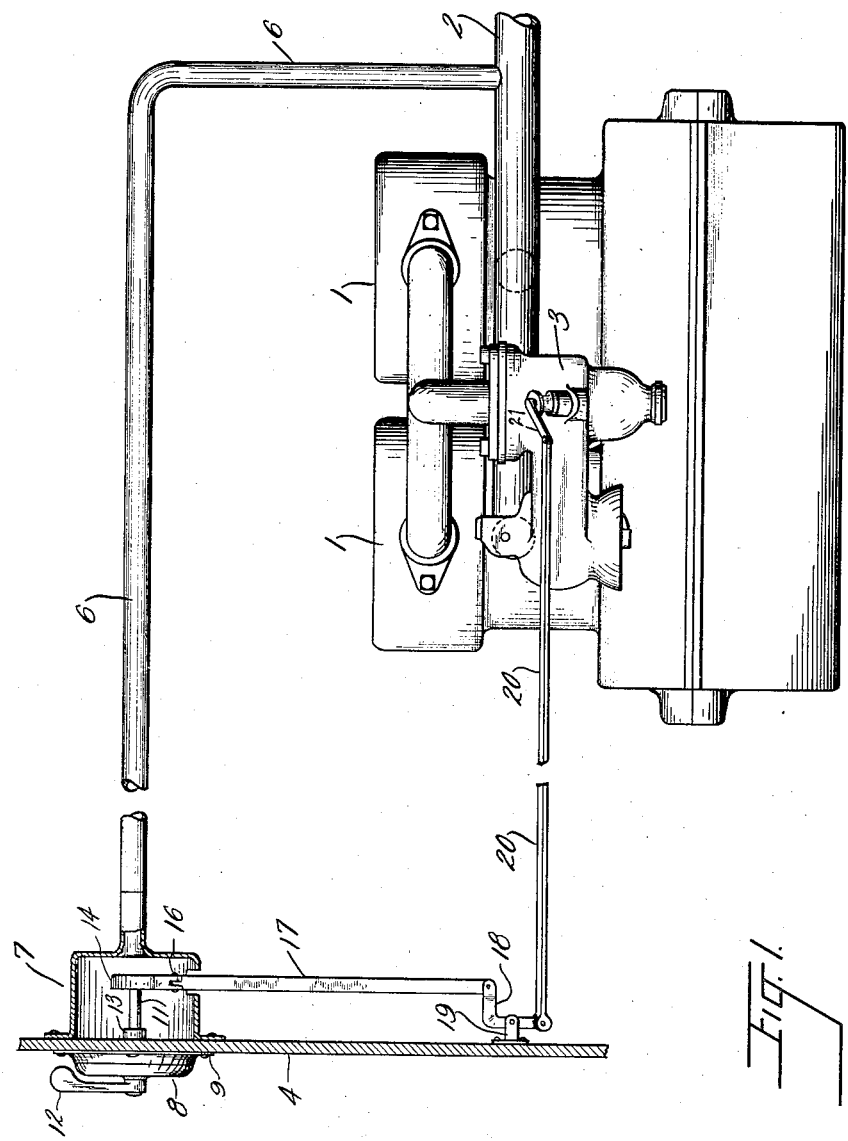

O. E. NELSON.
SYSTEM FOR INDICATING THE CONDITION OF INTERNAL COMBUSTION ENGINES.
APPLICATION FILED FEB. 13, 1915.
1,205,379.
Patented Nov. 21, 1916.
3 SHEETS—SHEET 2.
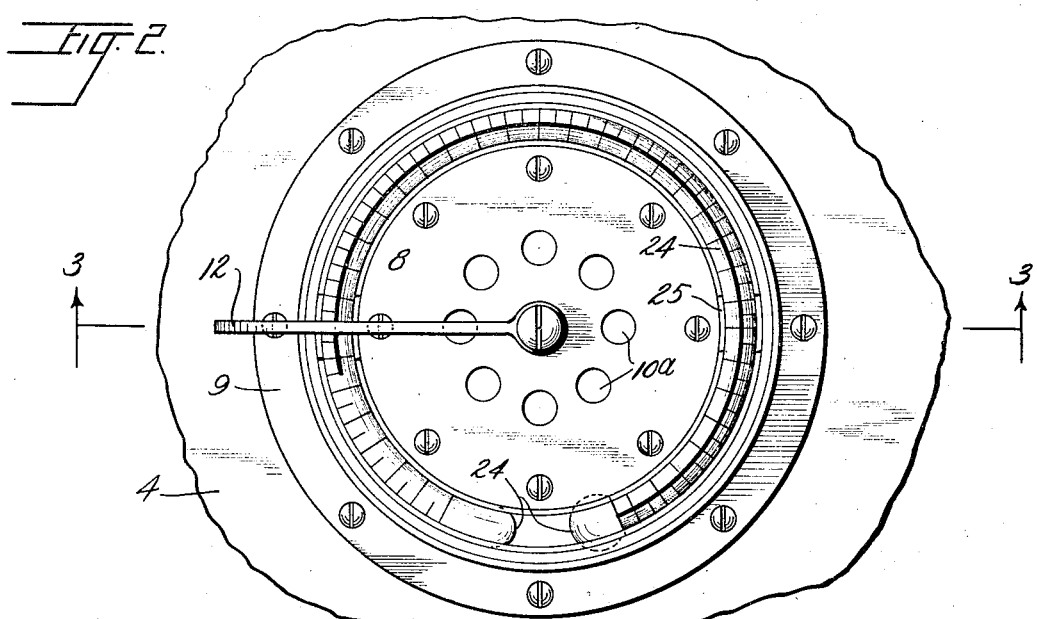
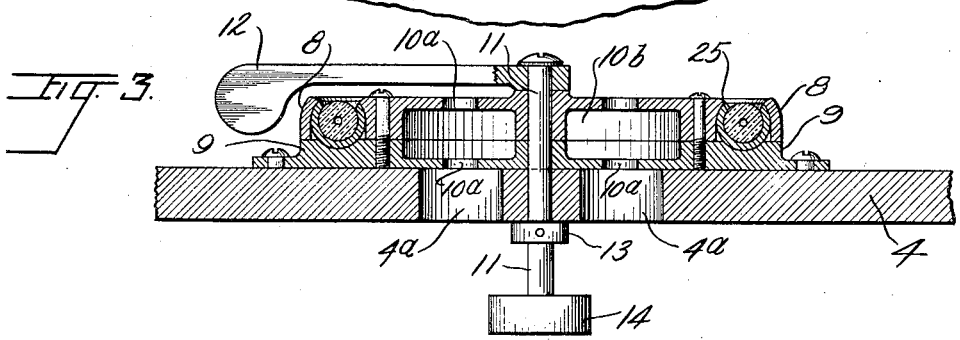
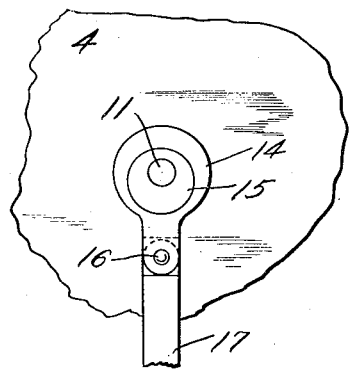
WITNESSES:
INVENTOR
O. E. Nelson
BY
H. J. Sanders
ATTORNEY

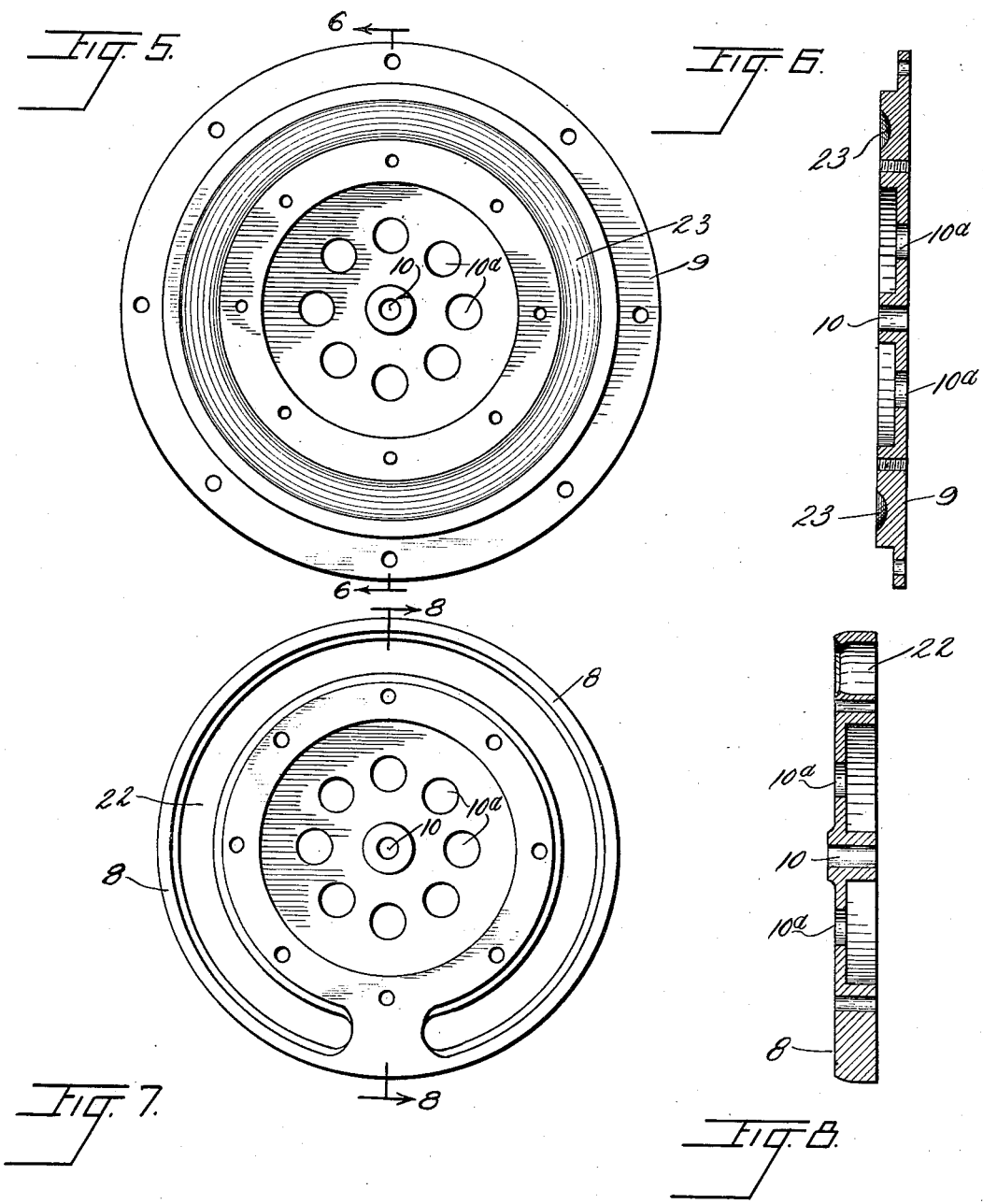

UNITED STATES PATENT OFFICE.

OSCAR EMMANUEL NELSON, OF OAKLAND, NEBRASKA.

SYSTEM FOR INDICATING THE CONDITION OF INTERNAL-COMBUSTION ENGINES.

1,205,379. Specification of Letters Patent. Patented Nov. 21, 1916.

Application filed February 13, 1915. Serial No. 8,076.

*To all whom it may concern:*

Be it known that I, OSCAR E. NELSON, a citizen of the United States, residing at Oakland, in the county of Burt and State of Nebraska, have invented certain new and useful Improvements in Systems for Indicating the Condition of Internal-Combustion Engines, of which the following is a specification.

This invention relates to a system for indicating the condition of internal combustion engines and it contemplates the provision of means for indicating the condition or temperature of the engine, the action of the temperature indicating means being controlled by the temperature of the gases which pass through the engine cylinder exhausts.

An object of the invention is to provide an effective indicator governed by the changes of temperature of the exhaust gases which will warn the operator of abnormal conditions inimical to the satisfactory operation of the engine, and which conditions can be remedied by manually operable means under the control of the operator.

The invention consists in the combination and arrangement of parts to be hereinafter fully described in the following specification, pointed out in the claims and illustrated in the accompanying drawings which form a part of said specification and in which:—

Figure 1 is a side elevation of my indicating system and apparatus connected to an internal combustion engine. Fig. 2 is a front elevation of the indicator attached to a suitable support. Fig. 3 is a section taken on line 3—3 of Fig. 2, with housing removed. Fig. 4 is a detail of a portion of the regulating mechanism. Fig. 5 is a plan of the lower section of the indicator casing. Fig. 6 is a section taken on line 6—6 of Fig. 5. Fig. 7 is a plan of the upper section of the indicator casing. Fig. 8 is a section taken on line 8—8 of Fig. 7.

Like reference characters indicate corresponding parts throughout the several views.

The reference numerals 1, 1 designate the cylinders of an internal combustion engine, 2, 2 the exhausts thereof, 3 the carbureter and 4 the dashboard, formed with air holes 4ª, of an automobile or other vehicle in which the engine may be used. The reference numeral 6 designates a pipe that communicates with the exhaust 2 and that leads into a housing 7, secured to the dashboard. Directly opposite the housing 7 upon the opposite side of the dash is a casing comprising top and bottom sections 8 and 9 respectively; both of said sections being formed with a central opening 10 through which the shaft 11 of a control lever 12 extends, and with gas outlets 10ª and interior gas chambers 10ᵇ. The shaft 11 also passes through the dashboard and upon the remote side thereof is provided with a stop collar 13 and with a casing 14 for cam 15; said cam and casing being located upon the shaft 11 and said casing being pivotally connected as at 16 to a pitman 17 that is connected to a bell-crank 18 carried by bracket 19 secured to the dash. To the bell-crank another pitman 20 is secured which connects with the lever 21 that controls the carbureter.

Referring again to the casing sections 8 and 9, the former is formed with a channel 22 and the latter with an alined groove 23 to accommodate the thermometer 24 which may be partially incased in an asbestos bed 25 to prevent sudden changes of temperature from affecting the thermometer. The thermometer is graduated in degrees in the usual manner and when the carbureter is working properly the gases given off by the exhaust will have a certain temperature which will cause a certain known indication upon the thermometer. Should the temperature of the exhaust gases go above a certain limit or below a certain limit the fact will be shown by the thermometer because the exhaust gases, or part of them, pass through the pipe 6 and into the casing sections 8, 9 in proximity to the thermometer. An abnormal registration upon the thermometer can be cured by moving the control lever in one direction for too high a temperature and in the opposite direction for too low a temperature thus further opening or closing the carbureter and consequently increasing it or diminishing the speed of the engine.

What is claimed is:—

1. In a device for indicating the condition of an internal combustion engine, said device including a gas passage communicating with the exhaust of the engine, a housing communicating with said gas passage, a sectional casing communicating with said housing, said casing sections being formed with alined gas outlets and with alined gas chambers and with alined annular channels; a temperature responsive element disposed in the channeled portions of said casing sections, a shaft passing centrally through said sectional casing, a control lever for said shaft carried thereby and fuel control means for said engine operatively connected to said shaft.

2. In a device for indicating the condition of an internal combustion engine, said device including a gas passage communicating with the exhaust of the engine, a housing communicating with said gas passage, a sectional casing communicating with said housing, a temperature responsive element disposed in said sectional casing and a fuel control lever for said engine associated with said sectional casing and temperature responsive element whereby the speed of the engine may be varied according to the action of said element.

In testimony that I claim the foregoing as my own I have hereto affixed my signature in the presence of two subscribing witnesses.

OSCAR EMMANUEL NELSON.

Witnesses:
 ERNEST NELSON,
 HENRY SAMSON.